W. J. McKEE.
CASH REGISTER.
APPLICATION FILED OCT. 8, 1908.

940,816.

Patented Nov. 23, 1909.
7 SHEETS—SHEET 1.

Witnesses
D. B. Baenziger.
E. M. Brown.

Inventor
W. J. McKee.
By Edward N. Pagelsen
Attorney

W. J. McKEE.
CASH REGISTER.
APPLICATION FILED OCT. 8, 1908.

940,816.

Patented Nov. 23, 1909.
7 SHEETS—SHEET 3.

Witnesses
O. B. Baenziger.
E. M. Brown.

Inventor
W. J. McKee.
By Edward N. Pagelsen
Attorney

W. J. McKEE.
CASH REGISTER.
APPLICATION FILED OCT. 8, 1908.

940,816.

Patented Nov. 23, 1909.
7 SHEETS—SHEET 4.

Witnesses
O. B. Baenziger
O. M. Brown

Inventor
W. J. McKee
By Edward N. Pagelsen,
Attorney

W. J. McKEE.
CASH REGISTER.
APPLICATION FILED OCT. 8, 1908.

940,816.

Patented Nov. 23, 1909.
7 SHEETS—SHEET 5.

Witnesses
C. B. Baenziger.
E. M. Brown.

Inventor
W. J. McKee.
By Edward N. Pagelsen
Attorney

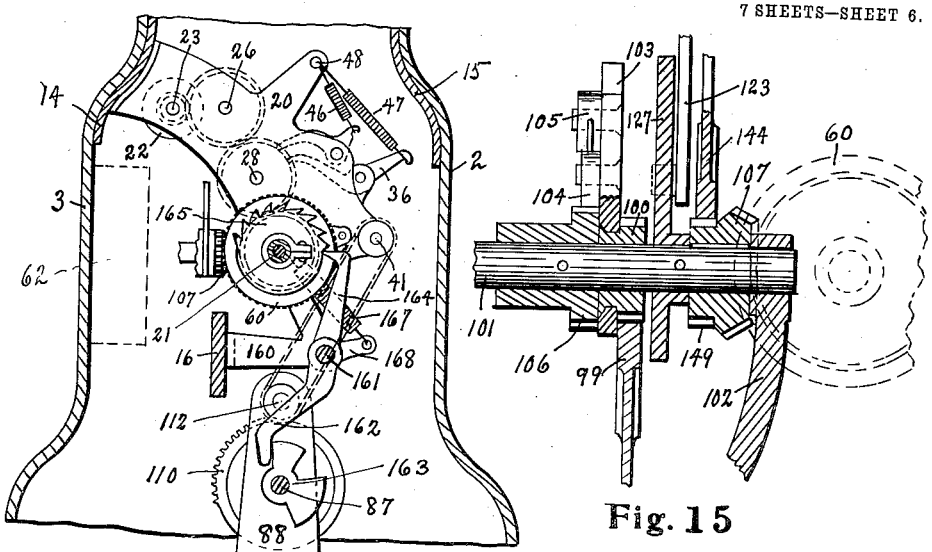
Fig. 14.
Fig. 15.
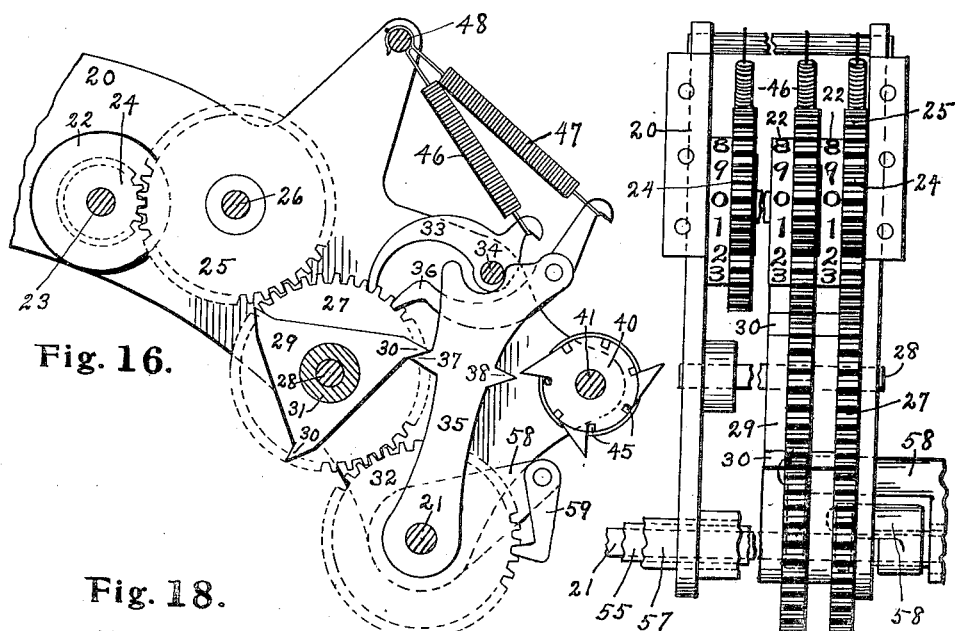
Fig. 16.
Fig. 17.
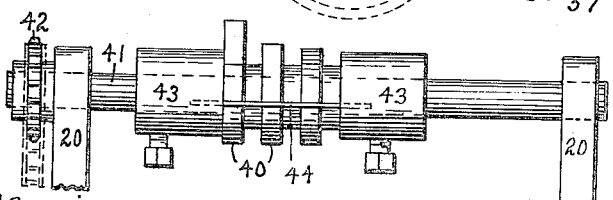
Fig. 18.

W. J. McKEE.
CASH REGISTER.
APPLICATION FILED OCT. 8, 1908.
940,816.
Patented Nov. 23, 1909.
7 SHEETS—SHEET 7.
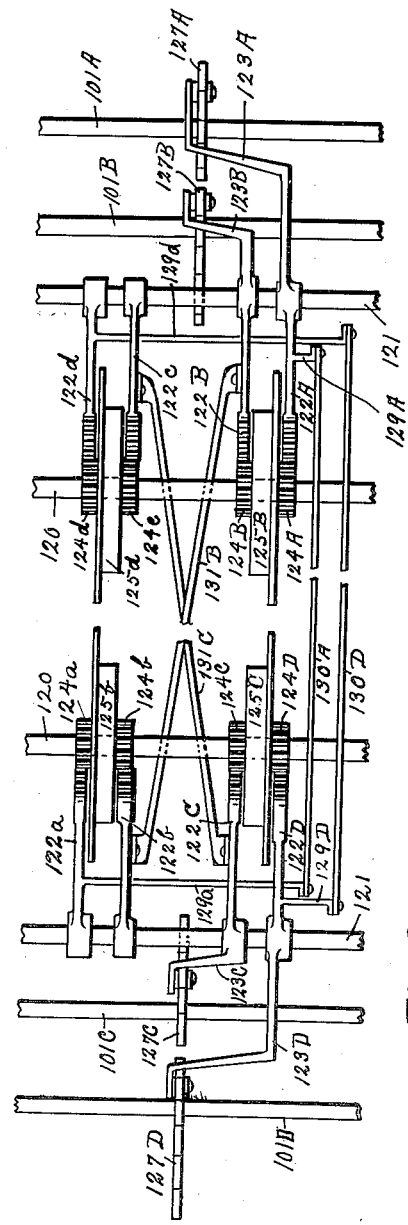
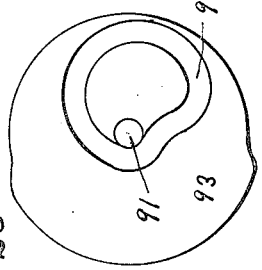
Witnesses
Q. B. Baenziger,
E. M. Brown.
Inventor
W. J. McKee.
By Edward N. Pagelsen
Attorney

UNITED STATES PATENT OFFICE.

WILLIAM J. McKEE, OF DETROIT, MICHIGAN, ASSIGNOR TO IMPERIAL CASH REGISTER COMPANY, OF DETROIT, MICHIGAN, A CORPORATION OF MICHIGAN.

CASH-REGISTER.

940,816.  Specification of Letters Patent.  Patented Nov. 23, 1909.

Application filed October 8, 1908. Serial No. 456,814.

*To all whom it may concern:*

Be it known that I, WILLIAM J. McKEE, a citizen of the United States, and a resident of Detroit, in the county of Wayne and State of Michigan, have invented a new and Improved Cash-Register, of which the following is a specification.

This invention relates to machines adapted to register the total of the amounts of cash indicated by successively actuating the proper keys, and its object is to provide a registering mechanism that shall be positive, strong and which can be easily inspected and kept in working order.

This invention consists in a novel key mechanism, an indicating mechanism, a registering mechanism and an actuating mechanism, all more fully hereinafter described and claimed and shown in the accompanying drawings, in which—

Figure 1:
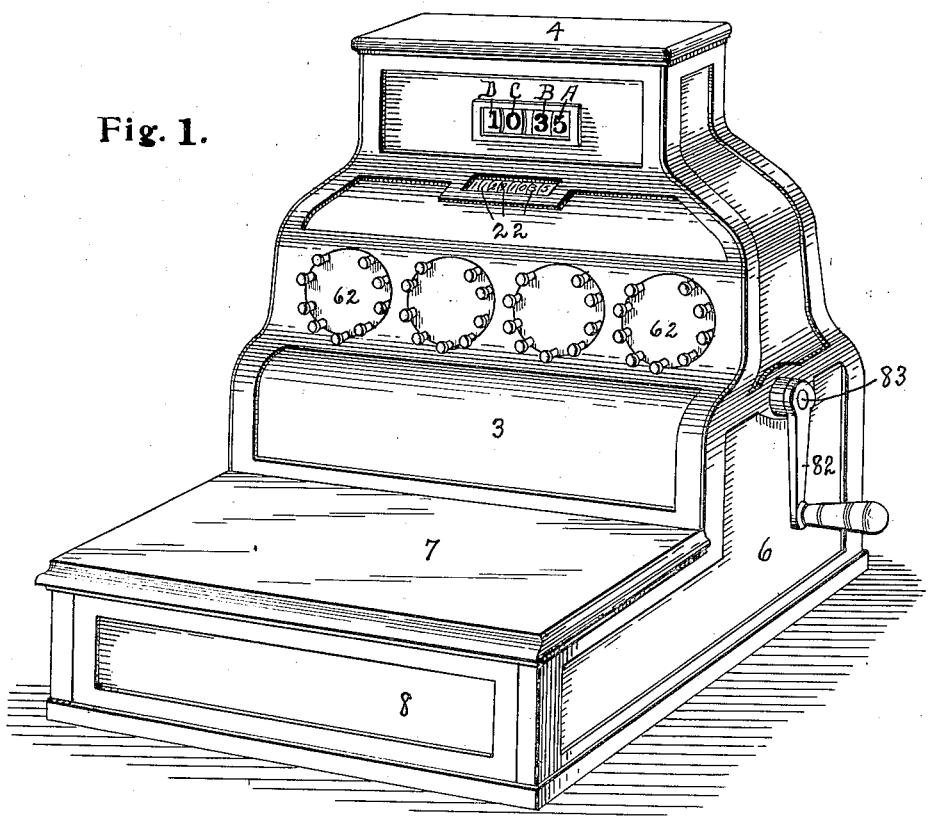
Figure 19:
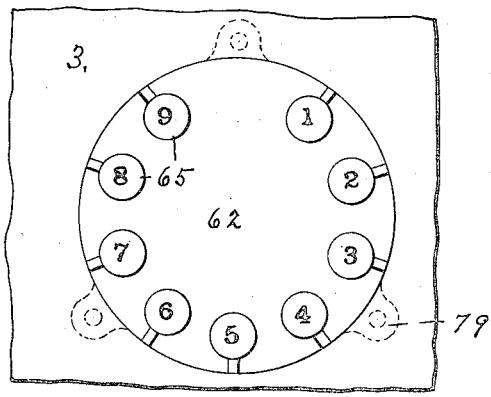
Figure 20:
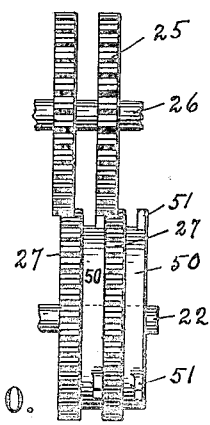
Figure 2:
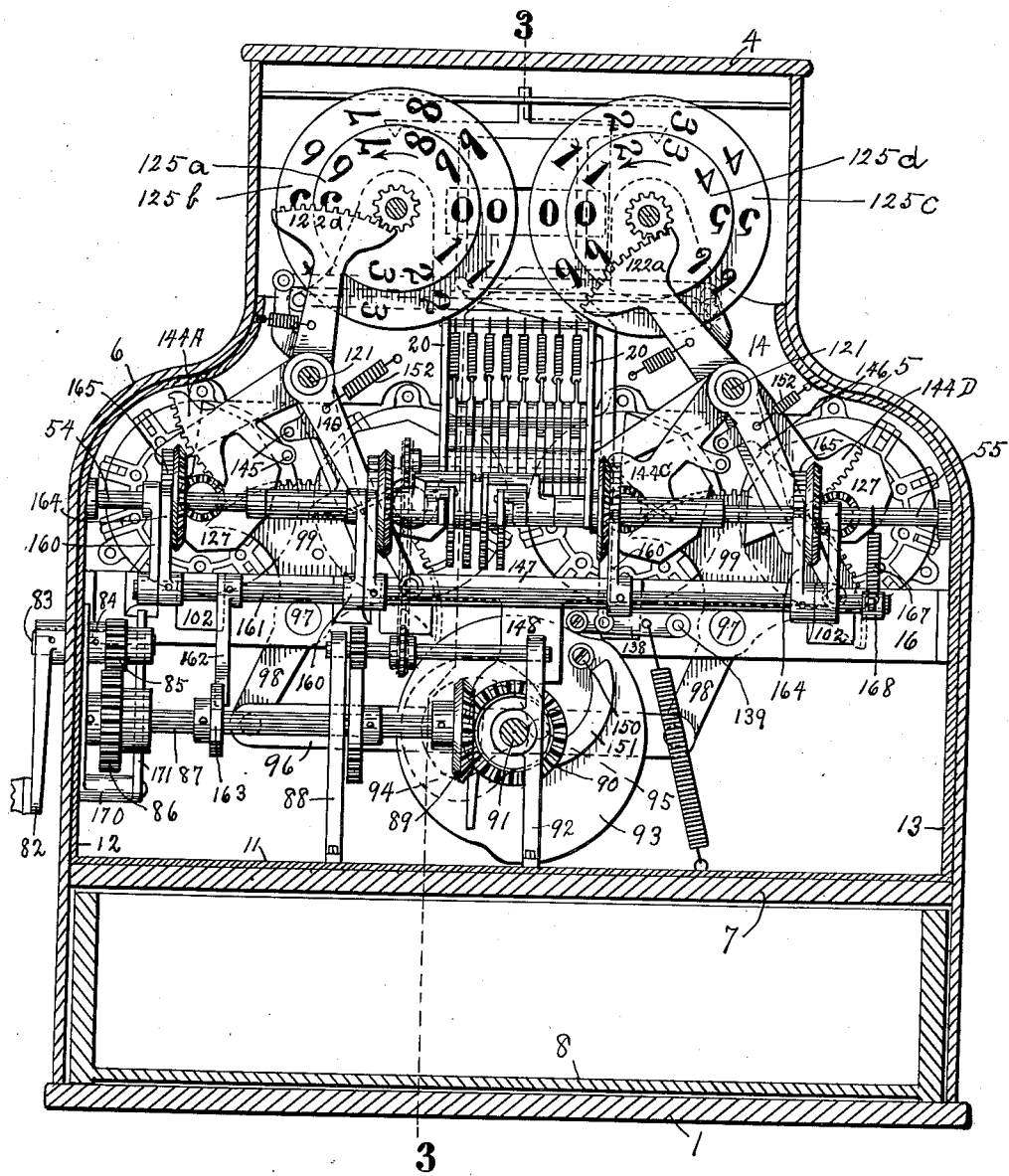
Figure 4:
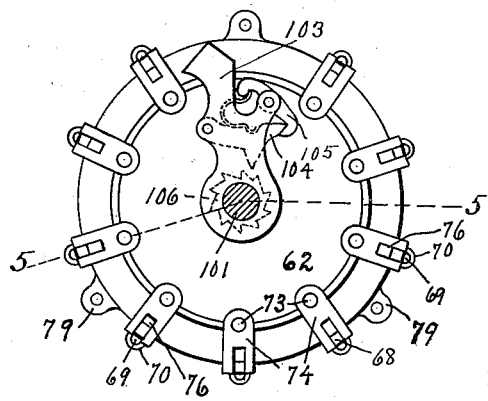
Figure 5:
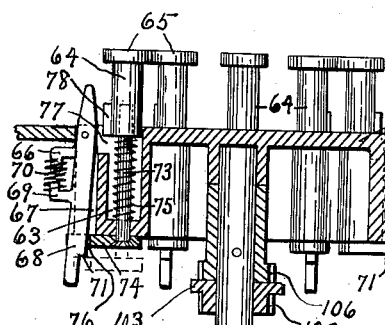
Figure 3:
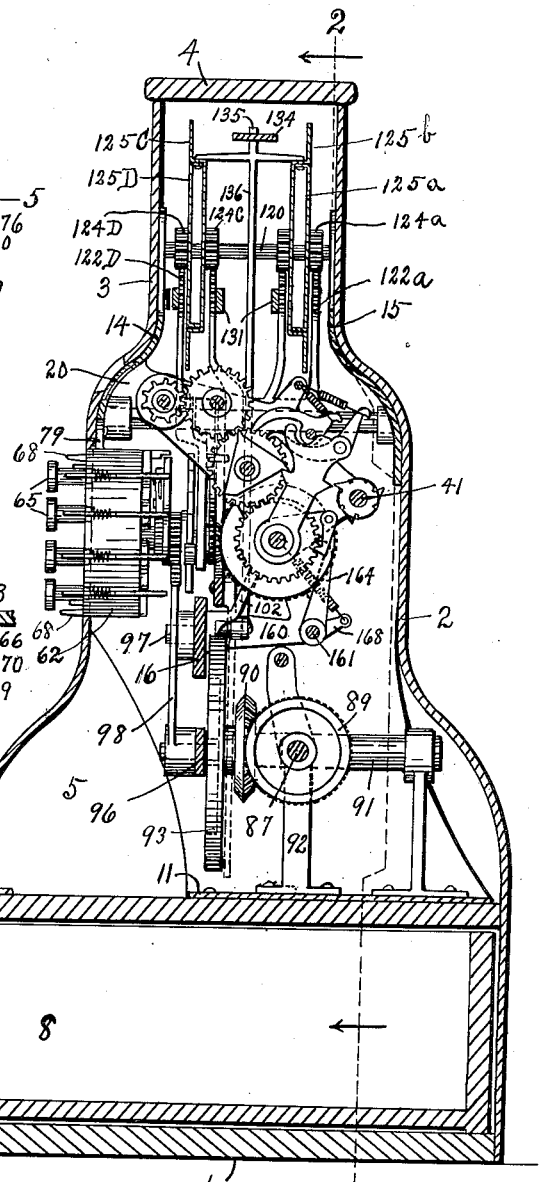
Figure 6:
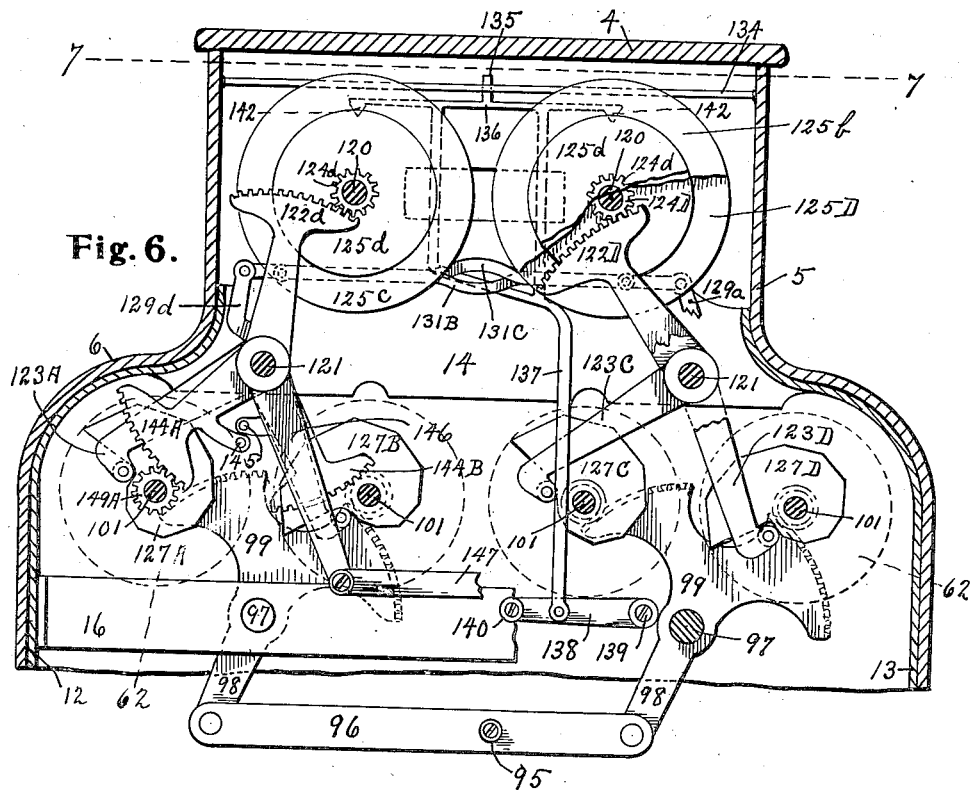
Figure 7:
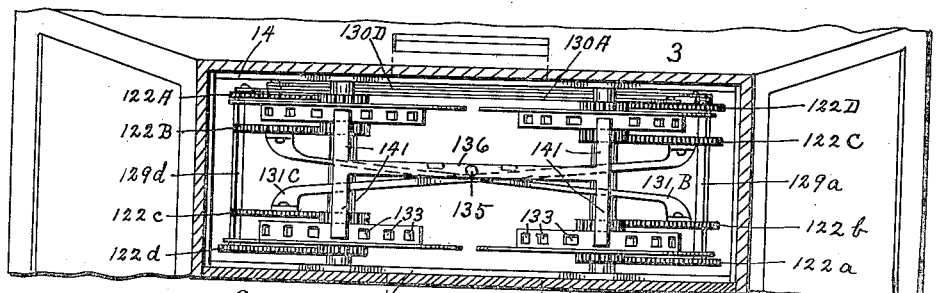
Figure 8:
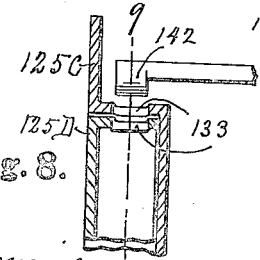
Figure 9:
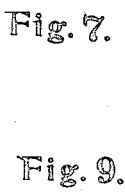
Figure 9:
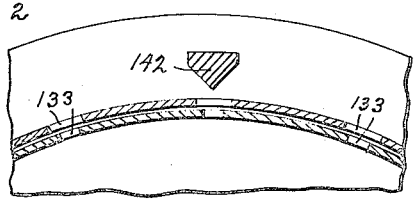
Figure 10:
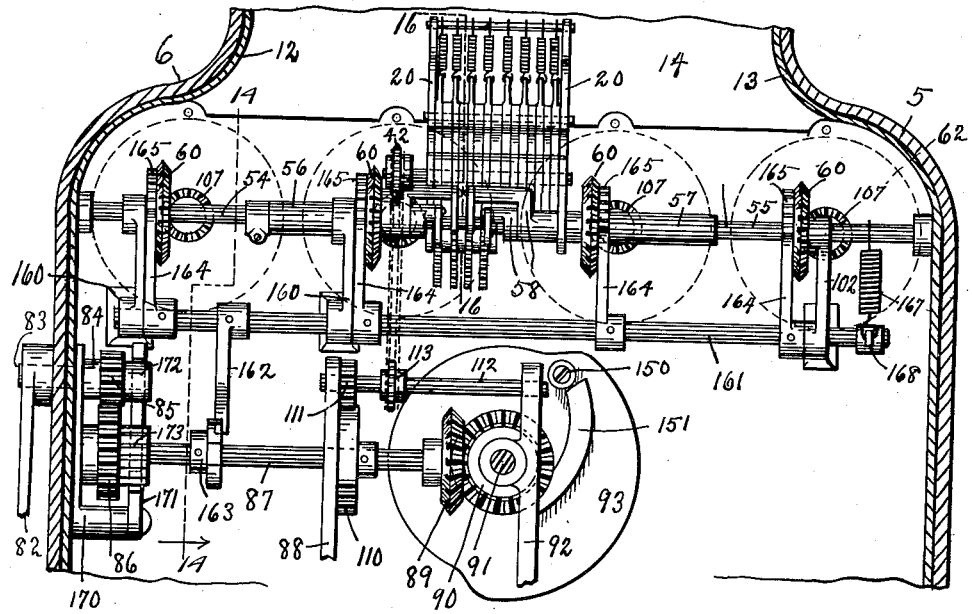
Figure 11:
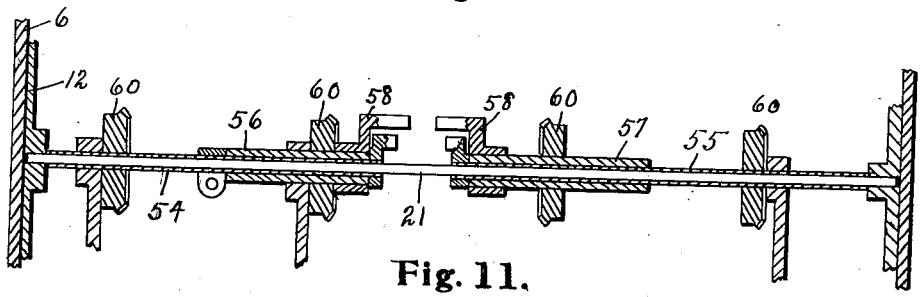
Figure 12:
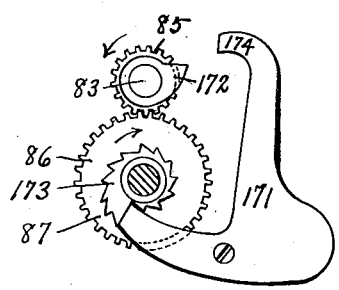
Figure 13:
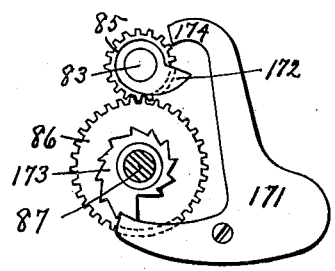

Figure 1 is a perspective view of the entire machine. Fig. 2 is a cross section of the mechanism on the line 2—2 of Fig. 3. Fig. 3 is a cross section on the line 3—3 of Fig. 2. Fig. 4 is a rear view of the selecting mechanism. Fig. 5 is a cross section on the line 5—5 of Fig. 4. Fig. 6 is a detail view of the indicating mechanism. Fig. 7 is a longitudinal cross section of the same on the line 7—7 of Fig. 6. Figs. 8 and 9 are details of the indicating wheels on a larger scale. Fig. 10 is a rear view of the actuating mechanism for the registering mechanism. Fig. 11 is a vertical cross section of a detail of this actuating mechanism. Figs. 12 and 13 are views of the stop mechanism for the actuating crank. Figs. 14 to 18 are details of the registering mechanism, Fig. 14 being a cross section on the line 14—14 of Fig. 10. Fig. 19 is a front view of the selecting mechanism. Fig. 20 is a detail of the tens carrying mechanism. Fig. 21 is a diagrammatic view of a portion of the indicating mechanism. Fig. 22 is a front view of the same. Fig. 23 is a view of the main cam.

Similar reference characters refer to like parts throughout the several views.

The mechanism hereinafter described is shown mounted in a case composed of a bottom 1, a back 2, a front 3, a top 4, a left side 5, a right side 6, a slab 7 over the drawer, and a drawer 8. These parts, with the exception of the front, have nothing to do with the operation of the machine, and while a desirable design is shown, any other design may be employed. In the following description the point of observation, unless otherwise stated, is taken to be at the rear for the sake of clearness.

Within the outer case is a frame which supports all of the mechanism, with the exception of the key mechanism which is secured to the front of the machine but which may be carried by the frame, which frame slides into the case and may be held in place by the back. It consists of a bottom plate 11, sides 12 and 13, front plate 14 and back plate 15 which extend between the side plates, and a cross bar 16 whose ends are secured to the side plates. Various bearings and brackets are carried by the frame and will be described in their turn.

*The registering mechanism.*—Side plates 20 are secured to the front plate 14 of the frame and are steadied by the shaft 21 mounted in bearings carried by the side plates 12 and 13 of the frame. The front 3 of the case is provided with an opening, behind which are the wheels 22 which are marked with numerals to indicate amounts. These wheels are loosely mounted on the shaft 23 carried by the register frame plates 20. (See Figs. 16 and 17). Secured to or integral with each wheel 22 is a ten toothed gear 24 which meshes with a thirty-toothed idler 25, loose on the shaft 26, which shaft is mounted in the plates 20. The idlers 25, except that of highest denomination, each mesh with a similar thirty-toothed gear 27 loose on the shaft 28. Each of the lower three of the gears 27 has on its upper or right side a triangular plate 29 having points 30. These plates may be integral with their gears, or they may be connected thereto by means of the collars 31. Each of the four gears 27 of lower denomination meshes with an actuating gear 32 on the shaft 21. Each gear 27 is prevented from turning back by a pawl 33 mounted on a rod 34 which extends between the plates 20. Springs 46 hold the pawls 33 against the wheels 27.

Mounted on the shaft 21 at the right of each of the first three gears 32 is a tens-carrier 35 which carries a pawl 36 that engages the wheel 27 at its right, while it itself has an inclined lug 37 in the path of the teeth 30 of the triangular plate 29 of the next lower denomination and a second lug 38 in the path of a cam 40 on the shaft 41. The shaft 41 is revolubly mounted in the plates 20 and carries a sprocket wheel 42 through which it is given one complete revolution during the last half turn of the actuating handle in a manner to be explained later on. Secured to this shaft are the collars 43 which have small holes in their inner ends to receive the rod 44. This rod is adapted to fit any one of the notches 45 in the cams 40 and hold them properly spaced. There is a carrier for each tens carrier 35.

The tens carriers are notched so they may have a lateral movement limited by the rod 34. A spring 47 extends from the outer arm of each pawl 36 to the rod 48 carried by the plates 20. There are but three of these tens carriers to transfer the tens to as high as the tens of dollars or eagles wheel. Beyond this the simpler well known "odd tooth" transfer is employed. See Fig. 20. Each wheel 27 has a drum 50 which carries three teeth 51, one for each ten teeth. At each ten revolutions of one wheel 27, the wheel 25 of next higher denomination will be given one full revolution through the action of these teeth 51.

Referring now to Figs. 10 and 11, it will be noticed that there are sleeves 54 and 55 mounted on the shaft 21, and sleeves 56 and 57 mounted on the sleeves 54 and 55 respectively. On the inner end of each sleeve is a crank 58 which carries a pawl 59 as indicated in Fig. 16, which pawls each engage one of the wheels 32 as shown in Figs. 2 and 10. By means of these cranks and pawls, the sleeve 54 will actuate the units or cents wheel 32, the sleeve 56 will actuate the tens or dimes wheel, the sleeve 57 will actuate the hundreds or dollars wheel, and the sleeve 55 will actuate the thousands or eagles wheel. Secured to each sleeve is a bevel-gear 60 which is turned by the actuating mechanism according to the key depressed.

*The key mechanism.*—The amounts to be registered are indicated by the operator by means of keys, which are in four groups of nine keys each, by which means any amount less than one hundred dollars may be indicated. There is one group for the units or cents, one for the tens or dimes, one for the hundreds or dollars, and one for the thousands or eagles. Each one of these groups is a duplicate of every other and operates in the same way. But one need therefore be described.

Secured to the front of the case are four similar cylinders 62, each of which supports the movable portions of the key mechanism for its particular denomination. The interior of each cylinder is cut away for the sake of lightness. Each cylinder is formed with nine bores 63, in each of which is slidable a round key stem 64 having a button 65 at its outer end, which button has one of the numerals from 1 to 9 inclusive. These keys are arranged as shown in Fig. 19. The cylinder has an exterior lug 66 in radial line with each key and radial groves 67 which pass through these lugs. In each groove is a finger 68 provided with a curved lug 69, between which and the adjacent bifurcated lug 66 is a spring 70 which tends to hold the inner end of the finger toward the center of the cylinder. The fingers project beyond the case as shown in Figs. 3 and 5, where they may be reached by the operator to release the keys. Each also has a shoulder 71 to hold the keys depressed as follows.

Each stem has a rod 73, on the outer end of which is a plate 74 having a slot 76 to receive the finger 68. The spring 75 on each rod normally holds the key out. A slot 77 between the slot 67 and bore 63 permits the lug 78 on the stem 64 to hold the key from turning. The cylinder is held in position by lugs 79. When a key is depressed, the plate 74 passes beyond the shoulder 71 on the adjacent finger and the spring 70 forces the shoulder 71 behind the plate, holding the key depressed. In case a wrong key is depressed the operator can release the same by pressing the outer end of the finger toward the center of the cylinder. The plate 74 on the selected key controls the time when the normally inoperative actuating mechanism shall be connected to the mechanism that turns the gear 60 of its particular denomination.

*The actuating mechanism.*—Projecting from the case is the operating handle 82 which is connected to the shaft 83, mounted in the bearing 84 carried by the side plate 12 of the frame. This shaft carries a pinion 85 which meshes with a gear 86 on the main shaft 87, which gear is twice the size of the pinion. The main shaft is journaled in a bracket 88 and in a bearing carried by the side plate 12. Secured to this shaft is a miter gear 89 that meshes with a similar gear 90 on the cross shaft 91 which is journaled in brackets 92. This shaft carries the main operating cam disk 93.

In the face of the main cam toward the front of the machine is a groove 94, shown in dotted lines in Fig. 2, which receives a pin 95 carried by the link 96. The cam makes one complete revolution at each operation of the machine and its action is to swing the link 96 first to the right (Fig. 2) and then back to the left. Referring now to Figs. 4, 6 and 15.

Extending between the frame sides 12 and 13 is the main cross bar 16 which carries two pins 97, upon which are mounted the levers 98 having segments 99 at the upper ends and their lower ends connected to the link 96. There is one lever for the two key cylinders of lower and one for the two cylinders of higher denomination. For clearness, one segment will be considered operating the mechanism of but one key cylinder. The other parts duplicate.

The segment 99 meshes with a gear 100, loose on the shaft 101 which is journaled at its front end in the cylinder, the other end being mounted in the bracket 102 carried by the bar 16. This bracket is shown in Fig. 3 and its foot is indicated in Fig. 2, the remainder being omitted for clearness. Secured to the gear 100 is a pawl carrier 103 (Fig. 4) which carries a pawl 104, normally held up by the hook 105. When a key and its plate 74 are depressed, the plate lies in the path of the hook 105. The pawl 104 is in the plane of the ratchet wheel 106 secured to the shaft 101, on the outer end of which is the gear 107 which meshes with the register actuating gear 60. The proportions are such that at the first half revolution of the cam 93 while the link 96 swings to the right, the pawl carrier 103 will make one full revolution to the right (Fig. 2) from the position shown in Fig. 4, and during the last half of the revolution of the cam, the parts all travel back the same distance. The operation of these parts is as follows. When a key is depressed, its plate 74 lies in the path of the heel of the hook 105. When the segment 99 swings the pawl carrier, no movement occurs until this heel of the hook engages a plate, when the heel will be pushed in and the pawl 104 released which immediately engages the ratchet wheel 106, turning it and the shaft 101. The distance this shaft is turned will depend upon the period of this engagement. As the plate 74 of the "9" key will be engaged after the carrier has made one tenth of a revolution, the shaft 101 will be turned nine tenths of a revolution, and as the gear 60 is three times the size of the gear 107, the respective arm 58 will be swung through an arc having one third the number of degrees the shaft 101 is turned. This compensates for the gears 32 having thirty teeth.

Upon the return stroke of the pawl carrier 103, the pawl 104 will ride up onto the incline of the ratchet teeth of the wheel 106 causing the hook 105 to swing out and engage. As the end of the pawl is inclined, the hook will slide down, raising the pawl the slight distance necessary for clearance.

The digits desired having been registered, it is necessary to actuate the shaft 41 of the tens carrying mechanism. Referring to Figs. 10 and 14, a mutilated gear 110 is seen on the main shaft 87, which gear will turn the gear 111 on the shaft 112 one revolution during the last quarter of the revolution of the main shaft. The shaft 112 is mounted in brackets 88 and 92. A sprocket wheel 113 connects to the sprocket wheel 42 by means of a chain. The shaft 41 will therefore be given one full revolution by means of this gear 110 during the last quarter of each operation of the main shaft.

Referring again to Figs. 4 and 5. The pawl carrier 103 swings in the same plane in which lie the inner ends of the fingers 68. When a key is depressed, the finger is permitted to swing inwardly, and its shoulder 71 passes under the plate 74. When the pawl carrier reaches this depressed key, the hook 105 contacts with the plate 74 and the pawl 104 is released, engaging the ratchet wheel 106 and operating the register. The instant after the hook 105 engages the plate 74, the outer inclined end of the carrier engages the end of the finger 68, forcing it outward, and the shoulder 71 no longer hindering the spring 75 from returning the depressed key, the parts will at once resume their normal position. The plate 74 sliding along the finger 68 will swing out the inner end of the finger from the path of the pawl carrier.

*The indicator.*—Extending across between the front and rear plates of the frame (Figs. 6, 7, 8, 9, 21 and 22) are two rods 120 upon which are journaled the eight indicator wheels 125. The case has a front and rear opening through which the salesman and the purchaser may both see that the proper amount has been registered. There are four wheels for each opening, and each wheel carries a set of numerals corresponding to those on the keys. The order of the wheels on the rear side is the reverse from that of the front.

Extending across between the front and rear plates of the frame are two shafts 121 upon each of which are mounted four segment arms 122, one for each indicator wheel, and two arms 123, one for each denomination. Each arm 123 engages the face of nine-steps cam 127 secured to a shaft 101. (Fig. 15). The units and tens arms 123 are integral with their segment-arms 122 for the front of the machine. For clearness, a diagrammatic view is shown in Fig. 21. The parts for the indicator wheels on the front of the machine have a capital letter A, B, C, D affixed to the reference numeral while the parts for the rear indicators a small letter, a, b, c, d, the letters A, a, being for the cents, B, b, for the dimes, etc. Fig. 22 is taken from the front of the machine, the opposite from the other views. Each arm 122 has a segment that engages a gear 124 secured to a register wheel 125.

Referring now to Fig. 15, it will be observed with a cam 127 is secured to the shaft 101 and will turn with it when the shaft is actuated by the pawl carrier 103. This cam has ten steps, (Fig. 6) and is engaged by the small roller at the end of the arm 123.

Whenever the shafts 101 are turned, each respective arm 123 will be swung to the right (Fig. 22) and each disk 125 will be turned to the right through the same arc that the shaft 101 is turned. This refers to the arms 123 A—B—C and D, and the indicator wheels at the front of the machine. To turn the indicator wheels at the back of the machine the arms 122 A, D, *a* and *d* are provided with brackets 129 A, D, *a* and *d* respectively which are connected in pairs by the links 130 A and D. The arms 122 B and C are connected to the arms 122 *b* and *c* by means of the links 131 B and C. By these means, the corresponding indicators on both sides of the machine move in unison.

To aline the indicator wheels, they are each provided along their outer edges with ten openings 133 as shown in Figs. 8 and 9. A cross bar 134 (Figs. 6 and 7) extends above them and guides a projection 135 on a small frame 136 that has a downwardly extending arm 137 connected to the lever 138, which is mounted on the pin 139 on the bar 16, a roller 140 on the outer end of this link rides on the cam 93 by means of which the frame 136 is raised during the time in which the shafts 101 can be turned. Projecting from the frame 136 are four arms 141 having points 142 that are adapted to enter the openings 133 in the rims of the indicator wheels and thus force the characters upon them to line.

To return the indicator wheels, and the pawls 59 of the register actuators to normal position, the arms 144 are mounted on the shafts 121 and are provided with pins 145 which project into the paths of the arms 146 connected by the link 147. The arms 144 have segments that engage the gears 149 connected to shafts 101. This link has a plate 148 extending down in the rear of the cam 93 in the path of the pin 150 on the rear of the plate cam 93, which also carries a cam 151. The operation of the parts are as follows.

The indicator wheels 125 remain stationary until the machine is actuated to register a succeeding sale. Upon the operation of the handle 82 the disk 93 begins to turn, the pin 150 contacts with the plate 148 moving it and the link 147 to the left. The arms 146 engage the pins 145 on the arms 144, turning the cams 127 and gears 107 to the left, turning the disks 125 to the right until the parts assume the positions shown in the drawings. All this occurs during the first quarter of the revolution of the cam 93, and while the pin 95 travels in a concentric portion of the cam groove 94 in the front face of the cam 93, further movement of the cam 93 carries the pin 150 past the center and to the right, whereupon the link 147 swings back under the pull of the springs 152 connected to the arms 146. (See Fig. 2). To prevent too rapid return, the disk 93 has a guiding cam 151 in the path of the plate 148. At this time the inclined portion of the cam groove 94 begins to move the pin 95 and link 96 to the right, as explained before.

To justify the register the following mechanism may be employed. Brackets 160 project from the bar 16 and support a shaft 161. the bracket 102 (on the right in Fig. 2) is formed to take the place of one of the brackets 160. An arm 162 extends down into the path of the double cam 163 on the shaft 87. The brackets 160 extend up and furnish bearings for the sleeves 54, 55 and 56. Arms 164 are secured to the shaft 161 and each has a tooth adapted to engage a mutilated ten-toothed ratchet wheel 165 secured to, or integral with each gear 60. (See Fig. 14). The arms 164 are held toward the wheels 165 by the spring 167 extending from the sleeve 55 to the arm 168 on the shaft 161. At the first quarter of the revolution of the cam 93, the register actuators and the indicators are reset, during which time the gears 60 and 165 turn to the left (Fig. 14). It is therefore advisable to lift the arms 164 out of engagement with the ratchet wheels which is done by the smaller leaf of the cam 163. After this the ratchet wheels 165 are in the position shown in Fig. 14, and the teeth on the arms 164 engage the first teeth of the wheels, which teeth are formed inclined as shown, so that the pressure of these arms will aline them. The arms are then immediately raised under the action of the other leaf of the cam 163 in order that the gears 60 may be turned the proper amount to register the amount set up on the keys. At the end of the operative half revolution, the arms 164 again engage the ratchet wheels, thus preventing any movement during the transfer of the tens.

To prevent the operator from turning the handle 82 more than two revolutions, the mechanism shown in Figs. 10, 12 and 13 is employed. Pivoted on the small frame 170, secured to the side plate 12, is a lever 171, whose upper arm lies in the plane of a lug 172 secured to the gear 85 and whose lower arm is in the plane of the toothed wheel 173 on the shaft 87. The stopping point of the parts is shown in Fig. 12. The course of the shaft 83 is to the left, the lower arm 171 engaging the teeth on the wheel 173 prevents the shafts being turned back. As the wheel 173 turns, the hook 174 is moved toward the shaft 83 until it is finally in the path of the lug 172. As the lever is nearly balanced, the lug 172 will strike the hook 174, stopping the handle. At this point, the longest tooth of the wheel 173 will have passed the lower end of the lever, which will swing inward, carrying the upper end away from the lug 172. There is sufficient clearance to permit free movement.

Having now explained my improvements what I claim as my invention and desire to secure by Letters Patent is:—

1. In a cash register, the combination of a case, a series of cylinders mounted at the front of the case, each provided with nine longitudinal bores in a circle about the center and a longitudinal groove in the surface outside of each bore and connecting thereto by means of a slot, a stem mounted in each bore, a button on each stem, a lug on each stem to enter the slot to prevent the stem from turning, a finger mounted in each groove, a spring in engagement with each finger tending to swing the rear end of the finger inward, a plate mounted on each stem and adapted to be moved inwardly with the stem and held in said position by a finger, a registering mechanism, and an actuating mechanism, and a connector adapted to turn the registering mechanism when released by the plate on the stem.

2. In a cash register, the combination of a case, a series of cylinders mounted at the front of the case, each provided with nine longitudinal bores, selecting stems mounted in said bores, fingers carried by the cylinders and adapted to hold the stems in a depressed position, a register, an actuating mechanism for the same, and a connecting mechanism concentrically mounted with the cylinders which causes the actuating mechanism to operate the register when released by the depressed stem.

3. In a cash register, the combination of a case, a series of groups of selecting stems mounted at the front thereof, a connecting device for each group, an indicator, a register, and an actuating mechanism, each connector comprising a pawl normally inoperative and adapted to travel in a path which is intersected by the depressed stems of its groups, and a gear connected to the register and actuator which may be turned by said pawl.

4. In a cash register, the combination of groups of depressible keys, one group for each denomination, a registering wheel for each group of keys, a shaft for each group, operating connections between each shaft and its respective register wheel, a normally inoperative actuator mounted on each shaft, and a connecting mechanism for each actuator adapted to be released by any key in the group.

5. In a cash register, the combination of a case, depressible keys mounted thereon in groups of nine, a shaft for each group central thereto, an actuator normally freely revoluble thereon, a connector carried by the actuator in the path which may be intersected by any key of the group, and a register wheel connected to the shaft and actuated thereby a distance depending upon the position of the key depressed.

6. In a cash register, the combination of a shaft, nine depressible keys arranged in a circle around the same, a finger to hold each key depressed, a gear on the shaft, a pawl carrier revolubly mounted thereon, a pawl on the carrier and a hook to hold said pawl out of engagement with the gear, the hook traveling in a path where it may contact with any key in the group and be caused to release the pawl, and a register actuated by the pawl according to the key depressed.

7. In a cash register, the combination of a series of keys in groups of nine keys each, of a normally inoperative connecting device for each group, a register and an indicator, and actuating mechanism, a lock for each key adapted to be released by a connector immediately after the key releases the connector, and a series of gears operated by said actuating mechanism through said connectors when released to turn the register and indicator.

8. In a cash register, the combination of a key, a member movable with the key, a finger mounted parallel to the key to prevent its return when depressed, a register, and an actuator normally disconnected from the register and traveling in a path to be connected thereto by a depressed key, the actuator releasing said key immediately after such connection is made.

9. In a cash register, the combination of a shaft, a series of keys arranged around the shaft, an actuator for said shaft normally disconnected therefrom, a connector controlable by any one of the keys, a cam secured to said shaft, a lever engaging said cam, an indicating disk and means whereby said lever may turn the disk, the amount of rotation depending upon the key through which the connector provides for the rotation of the shaft by means of the actuator.

10. In a cash register, the combination of a pair of shafts, two pairs of indicating disks on each shaft, an actuator for each disk, links connecting the actuators of the disks of each pair, shafts upon which the actuators are mounted, four shafts parallel to the others, a cam mounted on each shaft, levers connected to said disk actuators and engaging the cams, a series of keys for each cam, and operating means for the indicators controlled by the keys.

11. In a cash register, the combination of a pair of shafts, two pairs of indicating disks on each shaft, an actuator for each disk, toothed segments and links connecting each disk on one shaft to a disk on the other shaft, a series of keys for each two connected disks, and operating means to turn the disks according to the values of the selected keys.

12. In a cash register, the combination of four pairs of indicating disks, one pair for each denomination, an actuating segment for each disk, links for connecting the disks of each pair, a cam for each denomination, a lever connected to the segments of each pair and each lever contacting with a cam of that particular denomination, a group of keys for each denomination, and actuating means for turning each cam and pair of wheels according to the selected key of each group.

13. In a cash register the combination of a case, depressible keys mounted therein in groups of nine, means to hold the same in depressed position, a shaft for each group central thereto, a register having an operating wheel for each group of keys, an actuator normally freely revoluble on each shaft in both directions, a connector carried by said actuator and under the control of the keys, and means adapted to be turned by the connectors for moving the operating wheels, said actuator also serving to release the depressed keys.

14. In a cash register, the combination of an indicating mechanism comprising disks and actuators therefor, a series of shafts, one for each denomination of the indicators, a cam on each shaft, keys for each denomination, a selecting mechanism whereby the cams are positioned according to the selected keys, a main actuating cam and connected parts for operating the indicator cams whereby the cams and indicators are reset during the first quarter of the revolution of the main cam, and actuated according to the selected key during the second quarter of its revolution.

15. In a cash register, the combination of a registering mechanism, actuating gears therefor, and a tens carrying mechanism, of a set of keys for each denomination, an actuating cam for the machine, and connections between the keys and register, the parts being so proportioned and arranged that the register actuators will be returned to starting position during the first quarter of the revolution of the main cam, the register will be actuated during the second quarter of the revolution according to the keys selected, and the tens will be carried during the last quarter of the revolution of the main cam.

16. In a cash register, the combination of a plurality of sets of depressible keys arranged in circular groups, means to hold the keys in depressed position, a register comprising an actuating wheel corresponding to each group of keys and an operating device therefor, an actuating mechanism, and connectors between the actuating mechanism and the operating devices under the control of the keys of their respective groups.

17. In a cash register, the combination of a series of depressible keys arranged in circular groups, means to retain the keys in depressed position, a register, an actuating mechanism for the same, a connecting mechanism having a reciprocating movement concentric to each group of keys and under the control of the keys to cause the actuating mechanism to operate the register, and means carried adjacent to the connecting mechanism to release the keys.

In testimony whereof I have signed this specification in the presence of two subscribing witnesses.

WILLIAM J. McKEE.

Witnesses:
 ELIZABETH M. BROWN,
 EDWARD N. PAGELSEN.